July 6, 1954 F. M. THOMAS 2,682,775

STEPPING MECHANISM

Filed Sept. 28, 1948 2 Sheets-Sheet 1

INVENTOR
F. M. THOMAS
BY J. W. Schmied
ATTORNEY

July 6, 1954 F. M. THOMAS 2,682,775

STEPPING MECHANISM

Filed Sept. 28, 1948 2 Sheets-Sheet 2

INVENTOR
F. M. THOMAS
BY G. F. Kane
ATTORNEY

Patented July 6, 1954 2,682,775

UNITED STATES PATENT OFFICE 2,682,775

STEPPING MECHANISM

Frank M. Thomas, Morris Plains, N. J., assignor to Bell Telephone Laboratories, Incorporated, New York, N. Y., a corporation of New York Application September 28, 1948, Serial No. 51,628

7 Claims. (Cl. 74—125)

This invention relates to mechanisms for translating continuous rotary motion into intermittent rotary motion and particularly to stepping mechanism used in code tape readers, or sensing devices.

Code tape sensing devices or tape readers utilizing perforated code patterns in transverse lines which are explored by sensing fingers projected to encounter perforations of the tape are old in the art and are found in United States Patent 2,204,957 of June 18, 1940. The readers play an important role in present day automatic computing and billing systems. The sensing fingers of these readers travel varied distances to perform their functions, and this diversity, caused by some of the fingers passing through perforations in the tape, requires that the tape must be stationary while the sensing fingers are in operation. This requirement is necessary to prevent tearing of the tape if it were moving past sensing fingers which have encountered perforations and thus passed through the tape. It is therefore essential that the drum carrying the tape be propelled in a step-by-step manner with precision and in accurate time phase with respect to the moving of the sensing fingers relative thereto.

It is the object of this invention therefore to simplify and otherwise improve stepping mechanisms of the type which are particularly adaptable for use in propelling the tape drum of a code sensing device, or tape reader.

The stepping mechanism of this invention comprises a constantly rotating cam, a cam follower, and a pair of coil springs all of which cooperate in translating continuous rotational movement into an intermittent rotary movement and which, through the medium of a rack carried by the cam follower, impart a smooth, positive stepping motion to the tape drum of the code tape reader.

A particular feature of the invention resides in the use of combined cam and coil spring means which function to impart a substantially square motion to the rack supported by the cam follower and in coupling the follower with the tape drum at such time during a rotational cycle of a motor driven shaft to which the cam is fixed, that the power employed to step the drum is furnished exclusively by the spring means. More particularly, the rack carried by the cam follower is caused to move cyclically in four distinct directions with respect to a gear with which the tape drum is fixedly associated. In one movement the rack engages the drum gear, in the next movement the rack, while in engagement with the drum gear, moves forward in a slightly arcuate path at substantially right angles to the direction of the first movement; in the next movement the rack moves out of engagement with the drum gear; and in the fourth and final movement of the cycle the rack moves back to its initial position. The cam and spring means are so time-phased with respect to their actions on the cam follower that the first and second movements of the rack described above are effected by the spring means and the third and fourth movements of the rack result from the direct action of the cam on the follower. Thus the motive power which actually steps the tape drum is derived from the spring means and not from the motor driven shaft.

Another feature of the invention resides in an independent cam-controlled, spring-biased lock tooth which functions at precise times during a cycle of operation of the stepping cam to engage and disengage the drum gear so as to maintain the tape drum locked against rotation whenever the rack of the stepping cam follower is in uncoupled relation to the drum.

A further feature of the invention is embodied in an interposer magnet which, when energized enables the cam follower to experience a complete cycle of operations without interruption and, when deenergized inhibits the cam follower and its associated rack from performing a drum-advancing, or stepping movement.

A still further feature of the invention contemplates a stepper of unit design which may be assembled separately and independently of the reader of which it constitutes an essential component and which may be embodied in and removed from the reader structure as a separate, self-contained entity.

These and other features of the invention will be better understood from the following detailed description when read with reference to the accompanying drawings in which.

Figure 1:
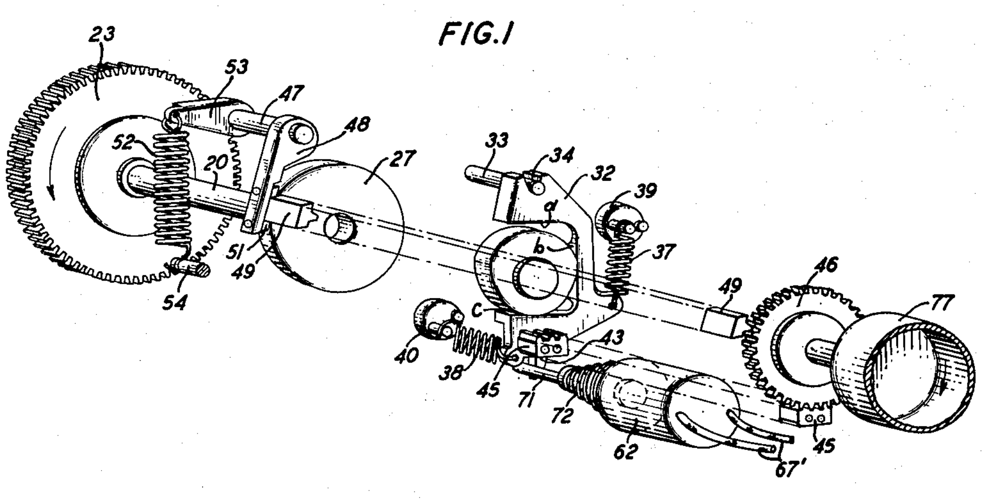
Fig. 1 is an exploded perspective of the fundamental elements of the stepping mechanism of this invention. The rack and lock tooth of the stepping mechanism have been duplicated in this figure for illustrative purposes.
Figure 4:
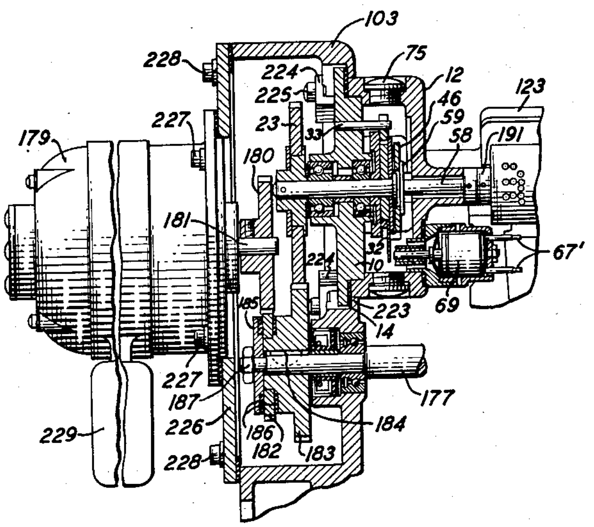
Fig. 4 is a sectionalized view of the stepping unit showing its relation to the motor controlled drive gear and the driven tape drum similar to Fig. 2 but also including the gear train by which gear 23 and shaft 20 are driven.
Figures 2, 3, 5:
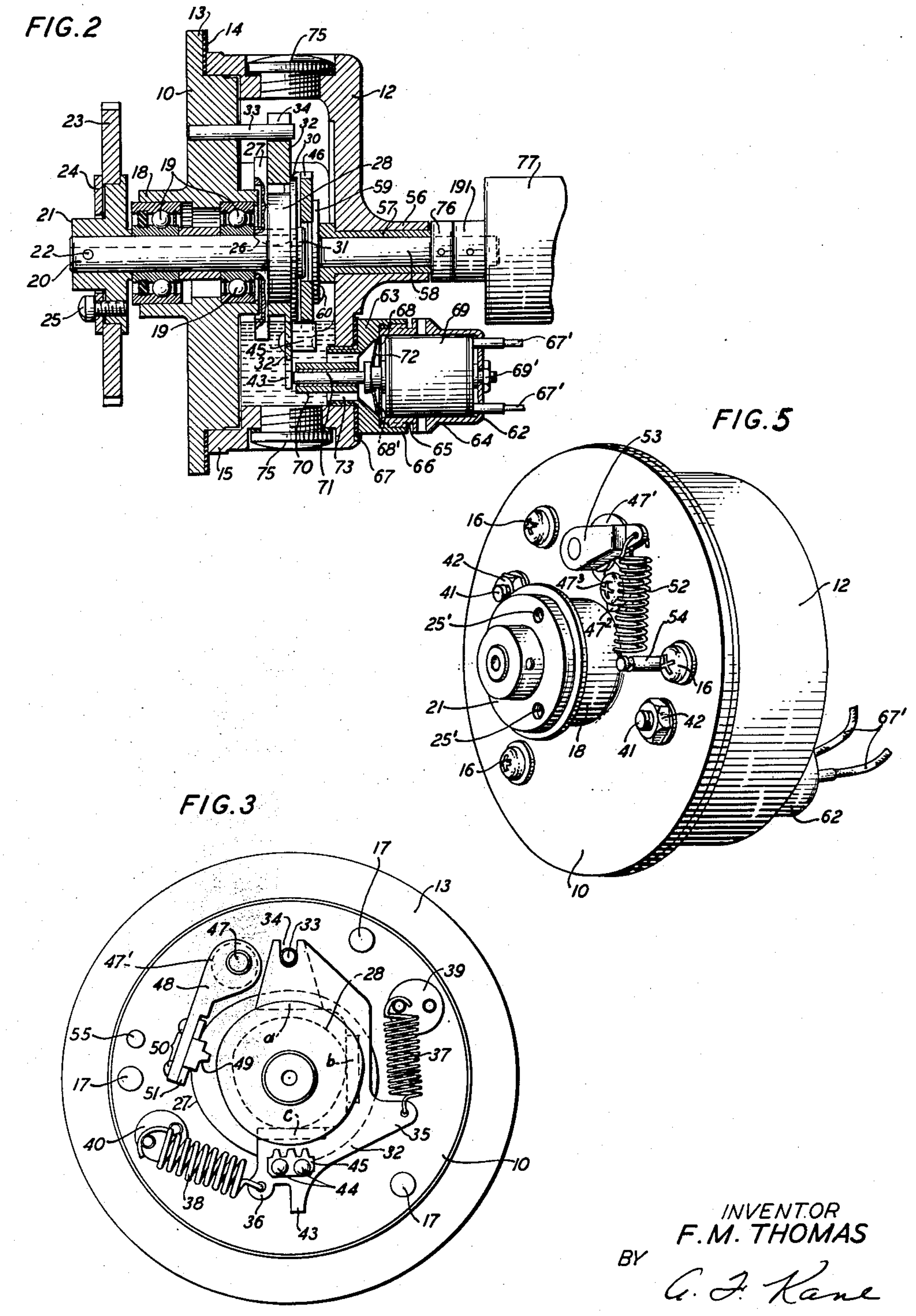
Fig. 2 is a sectionalized side view of the stepping unit showing its relation to the motor-controlled drive gear and the driven tape drum.
Fig. 3 is an end view of the stepping mechanism shown in Fig. 2.
Fig. 5 is a perspective view of the stepper unit and constitutes a rear view of the mechanism shown in Fig. 3.

Figs. 2, 3 and 5 show the stepper as an entity which can be completely assembled and adjusted before assembly in the reader and illustrate its unit type design; Fig. 4 shows a stepper in relation to a reader assembly and the motor controlled drive gear; Fig. 1 shows the essential elements of the stepper in exploded array. Referring particularly, at this time, to these figures the stepping mechanism is contained in a housing which consists of a substantially circular mounting plate 10 and a complemental cup-shaped shell 12. A flange 15 on the shell 12 fits over a circular shoulder effected by a flange 13 on the plate 10 when the two housing elements are in assembled relation, there being an annular gasket 14 interposed between the abutting surfaces of the flanges 13 and 15. Three screws 16 equipped with suitable washers (Fig. 5) pass through suitable holes 17 (Fig. 3) in the plate 10 and screw into corresponding holes in reinforcing webs in the shell 12.

The plate 10 is provided with a hub 18, the central opening in which communicates with an aligned hole in the center of the body of the plate to effect a seat for suitable bearings 19 upon which a shaft 20 is adapted to rotate. On its outer, or left end (Fig. 2) the shaft 20 supports a gear hub 21, a pin 22 serving to fixedly mount the hub on the shaft. The hub 21 is so configured as to provide a circular ledge upon which an annular drive gear 23 is clamped by means of a clamping plate 24 and suitable screws 25, only one of which appears in Fig. 2. The screws 25 screw into tapped holes 25′, Fig. 5.

The inner, or right end of shaft 20 is provided with a key 26 of well-known design which serves to fix a lock cam 27, a step cam 28 and a plate 30 to the shaft, the two cams and plate being suitably centrally apertured to accommodate the shaft. The cams 27 and 28 are located on the shaft in surface contiguity and the overall diameter of cam 27 is considerably in excess of that of cam 28. The plate 30 which is interposed between the hub 31 of shaft 20 and the cam 28 is of larger diameter than that of cam 28 so that the portion thereof which projects beyond the periphery of cam 28 together with the corresponding portion of cam 27 effect guide walls between which a step follower 32 is movably confined.

As more clearly disclosed in Figs. 1 and 3 the step follower 32 is an irregularly contoured element or yoke having an inner periphery comprising three flat surfaces *a*, *b* and *c* constituting, in effect, three sides of a square, the fourth side being open. In the position illustrated in Figs. 1 and 3 the step cam 28 is in peripheral contact with the follower at surfaces *b* and *c* and is out of contact at surface *a*. The plate 10 is suitably apertured to tightly accommodate a pivot pin 33 which projects through a slot 34 in the upper apex of the follower 32 and which constitutes a pivot about which the follower is adapted to oscillate as will be described in detail hereinafter. At 35 and 36 the follower 32 furnishes anchorages for one end of each of coil springs 37 and 38, respectively, the other ends of which are hooked to pins fixed to adjustable plugs 39 and 40, respectively. The plugs 39 and 40 fit into correspondingly shaped cavities in the plate 10 and are provided with centrally disposed integral screws 41 (Fig. 5) which pass through suitable holes in plate 10 and receive the nuts 42 which serve to anchor the plugs securely in position. The plugs 39 and 40 may be adjusted positionally to regulate the tension of springs 37 and 38 respectively. At its lower extremity the follower 32 is provided with an integral projection 43 which serves a purpose to be set forth hereinafter.

Immediately above the projection 43 the follower 32 has a step rack 45 secured thereto by means of rivets 44. This rack serves to couple a step gear 46 with the step follower 32 in a manner to be described hereinafter.

A short shaft 47 is housed in a bushing 47′ which, in turn, is housed in a suitable aperture in the plate 10 and is of sufficient length to project from either side thereof. On the right side (viewing Fig. 2), the shaft 47 carries a lock arm 48 which, at its outer end, carries a lock tooth 49. The lock tooth is fixed to the arm 48 in any suitable manner such as by rivets 50. Integral with the lock tooth 49 is a bearing plate 51 which is maintained in constant engagement with the periphery of lock cam 27 by means of a spring 52 (Figs. 1 and 5). On the left side of the plate 10 the shaft 47 has fixed thereto an arm 53 to the outer extremity of which is attached one end of the spring 52, the other end of the spring being anchored to a pin 54 which is force fitted in a suitable aperture 55 in the plate 10.

The bushing 47′ is constructed with its bore eccentric to its outside diameter and serves as an adjustment to align the lock tooth 49 with the step gear 46. The bushing is clamped in position by the clamp $47^2$ and clamp screw $47^3$ (Fig. 5).

The shell 12 is provided with a hub portion 56 which fixedly houses a bushing 57, which, in turn, serves as a bearing for a shaft 58. At its inner end the shaft 58 has fixed thereto a plate 59 which supports the annular step gear 46. The gear 46 is fixed to the plate 59 by means of three rivets, only one of which appears at 60 in Fig. 2.

Beneath the hub 56 the shell 12 is provided with a threaded cylindrical aperture in which an interposer magnet 62 is adapted to be mounted. The interposer magnet includes two shell pieces 63 and 64, the former having a threaded hub-like projection which screws into the aperture in the shell 12, and the latter having an externally threaded flange 65 which screws into the shell piece 63. The shell piece 63 is provided with an internally threaded flange 66 for this purpose. A suitable gasket 67 is interposed between the shell piece 63 and the outer surface of the shell 12. A diaphragm 68 and gasket 68′ are clamped between the shell pieces 63 and 64, the former effectively isolating the interior of the shell piece 64, which houses a magnet coil 69, from the interior of the shell piece 63. The magnet core 69′ is secured to the shell piece 64 by a nut as illustrated. The coil leads are shown at 67′.

The hub-like projection of shell piece 63 is provided with an integral sleeve 70 in which a plunger 71 is adapted to slide under the influence of the electromagnet coil 69 and a conical, spiral spring 72 which is interposed between the diaphragm 68 and a shoulder on the plunger 71. The hub portion of the shell piece 63 is provided also with a plurality of small cylindrical holes 73 which interconnect the area within the shell 12 and that within the shell piece 63.

At each of two diametrically opposed locations the shell 12 is provided with a cylindrical threaded opening into which fits a threaded cap 75. These openings constitute inspection ports through which oil may be poured into the area included between the shell 12 and the plate 10 or withdrawn therefrom. Oil thus admitted provides a bath in which the stepper elements operate. It will be noted that the diaphragm 68 shields the coil 69 of the interposer magnet from oil while permitting the plunger 71 to operate in the lubricant.

The shaft 58, near its right end is provided with a spacing collar 76. At the extreme right of Fig. 2 a tape advancing drum 77 of a code sensing device, or reader is shown keyed to the stepper shaft 58.

The cam and spring means of the stepping mechanism just described are so designed that the movement of the rack-supporting cam follower and therefore of the tape drum controlled thereby is smooth and positive. A complete cycle of operations of the stepping mechanism will now be described and for this purpose reference will be made particularly to Figs. 1 and 3. One cycle is completed during the interval in which the drive gear 23, and therefore the shaft 20, makes one revolution. During this cycle the rack 45 experiences four distinct movements which for descriptive purposes may be defined as the "step" movement in which the rack and gear 46 are in engagement and move rotationally one step under the action of coil spring 38; the "down" movement during which the rack is moved out of engagement with the gear 46 under the action of the cam 28 on the surface *c* of the follower 32; the "back" movement in which the rack is moved back by the action of cam 28 on surface *b* of the follower 32 in preparation for reengagement with the gear 46; and the "up" movement under the action of spring 37 and during which the rack is moved into engagement with the gear 46.

In the illustrated position of the stepper (Fig. 1) the rack 45 is in engagement with the gear 46, coil spring 38 is in distended condition, the low side of the cam 28 is in contact with the bearing surface *c* of the follower 32, and one of the high points of the cam 28 is in contact with the bearing surface *b* of the follower. The gear 23 is coupled to the motor 179 in a manner to be described hereinafter so as to rotate constantly in a counter-clockwise direction. The shaft 20 and its associated cams 27 and 28 therefore also rotate constantly in a counter-clockwise direction. As the cam 28 rotates counter-clockwise from the position thereof illustrated in Fig. 1, the low portion of the cam moves off the bearing surface *c* of the follower 32 onto the bearing surface *b* so that the energy stored in spring 38 is now expended in causing the cam follower to pivot about the pin 33 in a clockwise direction. Since the rack 45 is fixed to the follower and is, at this time, in mesh with gear 46, the latter, together with the tape drum 77, is rotated clockwise one step. This is the "step" movement of the rack.

The interval just described covers substantially one eighth of a cycle. During the next eighth of a cycle the follower 32 remains stationary and the high point of lock cam 27 moves off the bearing plate 51 which is associated with the lock arm 48. The contour of cam 27 is such that the shaft 47 under the influence of spring 52 gradually rotates in a counter-clockwise direction (Fig. 3) so that the lock tooth 49 gradually approaches and meshes with the gear 46.

During the third eighth of the cycle one of the high points of cam 28 moves into engagement with the bearing face *c* of the follower causing the follower to move downwardly against the restraining influence of spring 37. During this movement of the follower the pin 33 rides in the slot 34 and the rack 45 is moved out of engagement with the gear 46. Spring 37 is distended by this movement of the follower. This is the "down" movement of the rack. The gear 46 and therefore the tape drum 77 are now locked against rotation because of the meshing of the lock tooth with the gear 46, and the rack 45 is disengaged from the gear 46.

During the fourth eighth of the cycle the cam contours are such that the step rack 45 and the lock tooth 49 remain motionless. During the next, or fifth eighth of the cycle the high peripheral portion of cam 28 rides over the bearing surface *c* of the follower 32 and maintains the rack 45 in spaced relation to the gear 46. As the leading high point of the cam contacts bearing face *b* the follower is caused to move counter-clockwise about the pivot 33. The rack 45 is thus moved back in a slightly arcuate path to a position from which it is subsequently moved into engagement with the gear 46. This movement of the follower causes the spring 38 to be distended. As long as the high peripheral portion of cam 28 is in engagement with the bearing face *b* of the follower the rack is maintained in the position described. This is the "back" movement of the rack.

The contour of lock cam 27 is such that during this fifth eighth of the cycle the lock tooth 49 is maintained in engagement with the gear 46 to maintain the tape drum locked against rotation.

During the next, or sixth eighth of the cycle the step rack and lock tooth remain motionless. As the high portion of cam 28 rides against the face *b* of the follower during the next, or seventh eighth of the cycle the low portion of the cam permits the pull exerted by coil spring 37 on the follower to move the follower upwardly so that the rack 45 is moved into engagement with gear 46. During this movement of the follower 32, the pin 33 slides in the slot 34 This is the "up" movement of the rack during which the lock tooth is motionless.

During the final eighth of the cycle the effective contour of cam 27 is such that the lock tooth 49 is moved out of engagement with the gear 46 and the rack 45 remains in engagement therewith.

It is now apparent that, during one complete cycle of operation of the stepper the rack 45 is moved into and out of engagement with the gear 46; that while in engagement with the gear 46 it is moved clockwise one step to effect a similar movement of the tape drum 77; and that while disengaged from the gear 46 it is moved counter-clockwise to reset itself for reengagement with the gear. It is also now apparent that the power which actually steps the tape drum is produced by coil spring 38, such energy having been stored in the spring as a result of the counter-clockwise pivotal movement of the follower 32 effected by the cam 28.

While the movement of the follower 32 and therefore, of the rack 45, approaches a square movement, its traverse actually deviates from a square path in that the rack, during the pivotal movements of the follower about the pivot 33, moves in paths which are slightly arcuate, and during the other two movements it traverses two converging paths which are directionally radial with respect to gear 46 and if projected would meet at the axis of rotation of the gear. Thus it is that the engagement of the rack with the step gear and its disengagement therefrom are effected in a manner which precludes any possibility of binding or jamming of the teeth thereof.

In Fig. 1 the plunger pin 71 of the interposer magnet 62 is shown projected in the path of the follower appendage 43. In this position of the pin the magnet is deenergized and the clockwise, or stepping movement of the follower 32 is prevented. It is to be understood that in actual practice the interposer magnet is energized once during each cycle of operation of the stepper and this occurs just after the rack 45 has completed its "back" motion so as to effect the withdrawal of the pin 71 from the path of the projection 43 of the follower. It will be observed however that if for any reason the magnet is not energized when it should be, the continuous operation of the cam 28 is not interfered with and the rack will move into and out of engagement with the gear under control of the spring 37 and cam 28, respectively, while the clockwise movement of the rack, under the influence of spring 38 is prevented. Thus it is that the stepping of the tape drum may be arrested without necessitating the stopping of the driving motor 179, either deliberately or upon the occurrence of an abnormal condition which would require stoppage of the code tape.

The peripheral contour of cam 28 is such that the four motions of the rack 45 are produced at substantially constant acceleration and deceleration for smooth action.

The shaft 177, said shaft providing driving means for cams of the associated reader, is driven by a motor 179 through a gear train consisting of a gear 180 keyed to the motor shaft 181, a ring gear 182 and a gear 183, the last being keyed to the shaft at 184. The ring gear 182 is mounted on the hub of gear 183 and is held in frictional engagement therewith by means of a clamp disc 185, a pair of interposed spider washers 186 and a nut 187 The washers 186 constitute vibration damping means. The cam shaft gear 183 meshes with the drive gear 23 of the stepping unit hereinbefore described which in turn, steps the tape drum 77 in the manner previously described.

The drum 77 rotates on a stub shaft projecting from the frame of the associated reader and pinned to the frame by a pin. The left end of the drum is provided with an integral sleeve 191 which is keyed to the right end of shaft 58 of the stepper unit. In this manner the drum 77 is coupled to the stepper shaft 58.

One of the features of the invention hereinbefore described in retail relates to the unitary structure of the stepping mechanism. In other words the stepping mechanism is constructed as a separate and independent unit which may be removed from, or incorporated in a reader structure as a unit. This unit may be inserted through the gear box (103) opening so that the shaft projects into the opening in the sleeve projection 191 of the drum 77 until the annular gasket 14 abuts the lip or flange 223 of the frame. Four retaining clamps 224 and associated screw bolts 225 (only two appear in Fig. 4) serve to clamp the stepper unit to the gear box frame.

The motor 179 is secured to a plate 226 by screw bolts 227 and the plate is fixed to the frame by means of screw bolts 228. A motor switch and plug unit is shown at 229.

The stepping gear 23 is driven by the motor 179 through gears 180, 182 and 183 to effect the stepping of the tape drum 77 in the manner previously described.

What is claimed is:

1. In combination, a rotating driving member, a rotatable driven member having a gear fixed thereto, a rack, spring means, a carrier supporting said rack in the plane of the teeth of said gear and adapted to move said rack, by energy supplied by said spring means, radially into engagement with said gear and arcuately while in engagement therewith, and means for cyclically imparting to said spring means the energy to move said carrier radially and arcuately comprising a cam fixed to said rotating member and cooperating with said carrier to move it cyclically, radially and arcuately in directions opposed to those in which said carrier is moved by said spring means.

2. In combination, a rotating driving member, a rotatable driven member having a gear fixed thereto, a rack, a carrier supporting said rack in the plane of the teeth of said gear, and means for causing said carrier to move said rack radially into engagement with said gear, arcuately in one direction while in engagement with said gear, radially out of engagement with said gear and arcuately in another direction relative to said gear comprising a cam fixed to said driving member and cooperatively located with respect to said carrier so as to move said carrier radially and arcuately in predetermined directions and a pair of energy storing springs normally biasing said carrier against radial and arcuate movements in the said predetermined directions.

3. In combination, a shaft, a rotatable member having a gear fixed thereto, and means for translating continuous rotation of said shaft into rotary step-by-step movement of said rotatable member comprising a cam fixed to said shaft, a follower for said cam, said cam being peripherally contoured to move said follower radially and arcuately in two substantially right angularly related directions when operated through one complete cycle, spring means for moving said follower radially and arcuately in directions opposite to those of the cam-controlled movements of the follower, means for continuously rotating said cam relative to said follower whereby the cam and spring-controlled movements of said follower are performed cyclically in predetermined sequence, and a rack fixed to said follower and so disposed relative to the gear on said rotatable member as to move into engagement with said gear during one of the spring-controlled movements of said follower and to remain in engagement therewith only during the other spring-controlled movement of said follower.

4. The combination in an intermittent motion mechanism of a gear adapted to be intermittently rotated in one direction, a rack adapted to engage said gear, and means for imparting radial and longitudinal arcuate reciprocations to said rack in a predetermined sequence comprising an oscillatable and radially movable carrier supporting said rack in the plane of the teeth of said gear, a constantly rotating cam cooperating with said carrier and contoured to cyclically move said carrier in one direction arcuately whereby to position said rack for engagement with said gear and in one direction radially whereby to effect the disengagement of said rack from said gear, and coil springs cooperating with said carrier to move it in a reverse direction arcuately while said rack is in engagement with said gear and in a reverse direction radially to move said rack into engagement with said gear.

5. The combination in a code tape reader of a rotatable tape drum, a gear fixed thereto, a motor driven shaft, a cam fixed to said shaft, and a stepper for said drum controlled by said cam comprising a follower for said cam adapted to move radially in a predetermined direction and arcuately in a predetermined direction relative to said gear by force exerted by said cam, a spring biasing said follower against radial movement in the said predetermined direction, a spring biasing said follower against arcuate movement in the said predetermined direction, and a rack mounted on said follower and disposed in the plane of the teeth of said gear whereby said rack during one cycle of operation of said shaft is moved radially into engagement with said gear and arcuately while in engagement with said gear under control of said springs, and radially out of engagement with said gear and arcuately relative to said gear under control of said cam, in sequence.

6. In combination, a constantly rotating driving member, a rotatable driven member having a gear fixed thereto, a rack, spring means, a carrier supporting said rack in the plane of the teeth of said gear and adapted to move said rack, under the influence of said spring means, radially into engagement with said gear and arcuately while in engagement therewith, means for cyclically enabling said spring means to move said carrier radially and arcuately comprising a cam fixed to said constantly rotating member and cooperating with said carrier to move it cyclically, radially and arcuately in directions opposed to those in which said carrier is moved by said spring means, and electromagnetically controlled means for inhibiting said carrier against arcuate movement under control of said spring means.

7. In combination, a constantly rotating driving member, a rotatable driven member having a gear fixed thereto, a rack, spring means, a carrier supporting said rack in the plane of the teeth of said gear and adapted to move said rack, under the influence of said spring means, radially into engagement with said gear and arcuately while in engagement therewith, means for cyclically enabling said spring means to move said carrier radially and arcuately comprising a cam fixed to said constantly rotating member and cooperating with said carrier to move it cyclically, radially and arcuately in directions opposed to those in which said carrier is moved by said spring means, a lock tooth, and means for moving said lock tooth into and out of engagement with said gear at predetermined times during the radial and arcuate movements of said carrier comprising a second cam fixed to said constantly rotating member.

References Cited in the file of this patent

UNITED STATES PATENTS

| Number | Name | Date |
|---|---|---|
| 541,840 | Diehl | July 2, 1895 |
| 678,656 | Giroud | July 16, 1901 |
| 835,512 | Frenier | Nov. 13, 1906 |
| 2,201,798 | Scott | May 21, 1940 |
| 2,359,420 | Herzog | Oct. 3, 1944 |
| 2,481,115 | Heurtier | Sept. 6, 1949 |

FOREIGN PATENTS

| Number | Country | Date |
|---|---|---|
| 401,158 | Germany | May 17, 1923 |
| 596,002 | Great Britain | Dec. 24, 1947 |